United States Patent Office

Re. 25,400
Reissued June 18, 1963

25,400

ADSORBENT BRIQUETS FOR COMBINED ODOR AND MOISTURE REMOVAL

Ernest G. Doying, Fostoria, Ohio, assignor to Union Carbide Corporation, a corporation of New York No Drawing. Original No. 2,933,455, dated Apr. 19, 1960, Ser. No. 480,287, Jan. 6, 1955. Application for reissue Jan. 17, 1962, Ser. No. 167,479
2 Claims. (Cl. 252—428)

Matter enclosed in heavy brackets [ ] appears in the original patent but forms no part of this reissue specification; matter printed in italics indicates the additions made by reissue.

This invention relates to odor-adsorbent and dehydrating briquets, and to a method of producing the same.

Objectionable odors often develop in packaged food, vitamins and other medicinal products when these are stored for long periods. In some cases moisture destroys the freshness of the stored food or drug, or accelerates the formation of unpleasant odors. Both of these problems are accentuated under certain climatic conditions such as high temperatures and advanced humidity.

Heretofore, the practice has been generally to find a separate solution for each problem. Thus various sorbent materials, both of the odor-susceptible and dehydrating variety, have been suggested and tried in granular form. While these have performed satisfactorily in particular cases, their wide-spread use, especially with foods, has not been possible, because of the physical form in which they were employed.

More recently attempts have been made to solve the odor-developing and moisture-adsorbing problems simultaneously by adding to the article whose protection is desired, packets containing odor-adsorbent and desiccant materials. Although this practice is effective and quite satisfactory in particular cases, it would be easier, less expensive and of wider possible application, to simply insert a composite article of such material molded to conveniently useable form, provided the attainment of this form was possible without deleteriously affecting the sorbent characteristics of the constituents. It is known, however, that carbon loses a considerable part of its odor adsorptive capacity when moist, and no known attempts have hitherto been made to combine it with desiccants which by their nature are hygroscopic.

The prime object of this invention, therefore, is to provide adsorbent briquets for combined odor and moisture removal of such shape and form as to be conveniently and chemically useable for packaging.

Another object of the invention is the provision of a bonded composite of odor adsorbent and desiccant materials wherein each constituent retains its characteristic properties.

A further object of this invention is to provide a method for forming such composite briquets.

The invention by means of which these objects are achieved consists in briquetting mixtures of pulverized activated carbonaceous particles and a desiccant, combined by a suitable binder carried in a dispersing medium by compressing the mixture in a mold and evaporating the more volatile constituent, thereby causing the mixture to set to a rigid porous solid.

The four constituents of such a mixture are these:

(1) Carbon, which may be any of the conventional types, depending upon the desired adsorptive properties of the end product;

(2) A desiccant, which likewise may be any of the conventional water insoluble types, such as silica gel, activated alumina, zeolite, etc.;

(3) A binder which unites adsorbent and desiccant particles in the final product; and (4) A vehicle medium which serves to distribute the binder and to form a plastic mixture which may be compressed in a mold.

The characteristics of the formed briquets are a function of the carbon and desiccant characteristics. Thus, in general dense sorbents produce denser and stronger briquets than do low density sorbents. The carbon employed may be derived from any available source, and may be activated in any suitable manner. The choice of raw material and activating procedure depends upon the desired properties of the end product. Where the economics of the process are of paramount importance, it is well to note that even inexpensive by-product fines are suitable for forming into briquets.

The binder must be highly dispersed but not soluble in water. Further, the binding material should add plasticity to the mixture. It must also form a tough film which adheres well to the carbon and desiccant particles when set and must, of course, be permeable to gases and vapors after setting. Suitable binders *are* [may be divided into three groups]:

[Group I.—Polymeric materials which give thick viscous or jelly-like colloidal solutions with water such as methyl cellulose, hydroxy ethyl cellulose, casein and algin, etc.]

[Group II.—] Aqueous dispersions of thermoplastic resins such as the latices of polyvinyl acetate, polyvinyl chloride, polystyrene, styrene-butadiene copolymers, etc.

[Group III.—Thermosetting resins which form hard, dense cokes when carbonized, such as phenolic resins.] The percentage of binder used ranges between 5 percent and 30 percent.

The vehicle may be any volatile fluid in which carbon, binder and desiccant can be dispersed, but water is the most suitable medium because it is easily and completely removed from the mixture by heat alone, is stable and does not harm the sorbent's active surfaces, is not combustible, is inexpensive, and consequently does not have to be recovered. [In addition to water, several organic solvents such as acetone, benzene and alcohol can be used in the practice of the invention.] The amount of vehicle used in a mix depends upon the density and porosity of the sorbents, as well as upon the particular properties of the binder. Enough must be used to saturate the sorbents and to distribute the binder uniformly throughout the mixture. Where the vehicle selected is water, the amount thereof required with different sorbents may vary from 50 percent to over 100 percent of the sorbent's weight, this being the required amount to saturate the particles, and to produce a damp mixture.

The first step in the preparation of the briquets is to grind or size the sorbent particles according to the requirements of the desired end product. Small particles, that is those which will pass through a 100 or 200 mesh screen, are advantageous because they produce stronger and denser briquets. On the other hand, while coarser particles make weaker articles, they increase the porosity and decrease the density. Furthermore, the binder seems to have less effect upon the absorptive capacity of coarse particles, because it is confined mainly to the surface of the particles. Two methods are available for the mixing of the carbon, desiccant, binder and vehicle. Either the binder can be diluted with the vehicle and then mixed with the carbon and desiccant, or the carbon and desiccant can be combined with the binder and the vehicle added to give the desired consistency. The wet mix is then either molded under a pressure of 1 to 5 tons per square inch, and the briquets dried in an oven to vaporize the vehicle and set the bond, or the mix is dried in a heated mixer and the dry mix is pressed at an elevated temperature.

[In a further contemplated embodiment of the invention, a dry powdered resin is mixed with the active materials and molded under pressure at 100° C. to 200° C. In the case of the third group of binders mentioned above, the briquets are then further heated in an oven at 200° C. to complete the polymerization of the binder, or heated to 950° C. in an inert atmosphere of nitrogen and like gases to carbonize the bond.]

As an example of the practice of the invention, 75 grams each of pulverized activated carbon and silica gel were intimately mixed in an internal mixer. To this, a second mixture consisting of 27.3 grams polyvinyl acetate latex (55 percent solids and 45 percent water) and 77.7 grams water was added and the mixing continued for twenty minutes. Part of the resulting damp mix was then pressed at room temperature into briquets 1¼ inches in diameter by 1/10 inch thick under 3 tons per square inch pressure, while the remainder was air dried overnight and then pressed into briquets under the same pressure, but at 70° C. and 110° C. The briquets were finally dried several hours at 200° C. and then evaluated for the absorption of carbon tetrachloride vapor and moisture. The adsorption tests were run to constant weight in desiccators in a constant temperature room at 70° F. over liquid carbon tetrachloride or dilute sulphuric acid solutions corresponding to 5.7, 37.2 and 60 percent relative humidity at 70° F. The breaking strength of all briquets was also determined with an Izod impact tester. The briquets were held by a special vice and struck across the face at the center by the swinging pendulum. The results of these tests appear in Table I.

TABLE I

| | | | |
|---|---|---|---|
| Mix: | | | |
| Activated Carbon, pts | 50 | 50 | 50 |
| Silica Gel, pts | 50 | 50 | 50 |
| Binder Solids, pts | 10 | 10 | 10 |
| Total Water, pts | 60 | 60 | 60 |
| Final Water Content, pts | 50.8 | 2.9 | 2.9 |
| Sorbent Mesh (through) | 28 | 65 | 65 |
| Molding Conditions: | | | |
| Pressure, T./sq. in | 3 | 3 | 3 |
| Temperature, ° C | RT | 70 | 110 |
| Drying Schedule: | | | |
| Time, hr | 3 | 3 | 3 |
| Temperature, ° C | 200 | 200 | 200 |
| Finished Briquet Characteristics: | | | |
| Diameter, in | 1.26 | 1.26 | 1.27 |
| Thickness, in | .11 | .10 | .093 |
| Weight, g | 1.58 | 1.63 | 1.66 |
| $CCl_4$ Adsorption, Percent [1] | 76.5 | 74.2 | 70.6 |
| Water Adsorption, Percent [1]— | | | |
| at 5.7% R.H | .8 | 1.7 | .9 |
| at 37.2% R.H | 6.8 | 9.3 | 7.4 |
| at 60% R.H | 18.8 | 17.3 | 21.3 |
| Izod Impact, ft. lb | .085 | .055 | .12 |

[1] Pick-up based on weight of sorbents only.

The amount of carbon tetrachloride and moisture adsorbed by the pulverized adsorbents alone under the same conditions as the briquets were tested as shown in Table II.

TABLE II

| | Activated Carbon | Silica Gel |
|---|---|---|
| Percent $CCl_4$ adsorbed | 80.6 | 54.4 |
| Percent moisture adsorbed: | | |
| at 5.7% R.H | .2 | 4.1 |
| at 37.2% R.H | .8 | 20.2 |
| at 60.0% R.H | 22.7 | 33.3 |

Comparison of these data with the results in Table I shows that the bonding of the two adsorbents into a solid piece does not destroy nor materially alter their ability to adsorb either organic vapors or moisture. The composite adsorbed more carbon tetrachloride than a weighted mixture of the two adsorbents would have, and only 25 percent to 30 percent less moisture.

In addition to briquets, pellets, rods, spheres, Raschig rings, etc., are other forms of this invention which are practical and feasible for particular uses.

What is claimed is:

1. An odor and moisture adsorbent composition consisting of a shaped mixture of fragmentary activated carbon particles and a desiccant selected from the group consisting of activated alumina, zeolite and silica gel bonded with a water-dispersible and water-insoluble polymerized binder selected from the group consisting of polyvinyl acetate, polyvinyl chloride, polystyrene, and styrene-butadiene copolymers, said binder being present in an amount ranging between 5 percent and 30 percent by weight of said composition. [, and a vehicle for said binder, said vehicle being selected from the group consisting of water, ethyl alcohol, benzene, and acetone.]

2. An adsorbent unit consisting of equal amounts by weight of activated carbon and silica gel with from 5 percent to 30 percent by weight of a binder selected from the group consisting of polyvinyl acetate, polyvinyl chloride, polystyrene and styrene-butadiene copolymers. [, together with a vehicle for said resin, said vehicle being selected from the group consisting of water, ethyl alcohol, benzene and acetone.]

References Cited in the file of this patent or the original patent

| | | |
|---|---|---|
| 1,972,368 | Alex | Sept. 4, 1934 |
| 2,209,928 | Nowak et al. | July 30, 1940 |
| 2,423,702 | Hart | July 8, 1947 |
| 2,428,252 | Von Stroh | Sept. 30, 1947 |

OTHER REFERENCES

Gregory: "Uses and Applications of Chemicals and Related Materials," volume II, pages 262–263 (1944).